United States Patent
Hara et al.

(10) Patent No.: US 11,801,828 B2
(45) Date of Patent: Oct. 31, 2023

(54) PARKING ASSISTANCE DEVICE, PARKING ASSISTANCE METHOD, AND COMPUTER PROGRAM PRODUCT

(71) Applicant: HONDA MOTOR CO., LTD., Tokyo (JP)

(72) Inventors: Yuki Hara, Wako (JP); Hiroshi Yamanaka, Wako (JP); Yasushi Shoda, Wako (JP); Syoichi Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

(21) Appl. No.: 17/118,737

(22) Filed: Dec. 11, 2020

(65) Prior Publication Data

US 2021/0179089 A1    Jun. 17, 2021

(30) Foreign Application Priority Data

Dec. 13, 2019   (JP) .................................. 2019-225911

(51) Int. Cl.
*B60W 30/06*     (2006.01)
*B60W 30/09*     (2012.01)
(Continued)

(52) U.S. Cl.
CPC ............ *B60W 30/06* (2013.01); *B60W 30/09* (2013.01); *B60W 30/0953* (2013.01);
(Continued)

(58) Field of Classification Search
CPC .. B60W 30/06; B60W 30/09; B60W 30/0953; B60W 30/0956; B60W 40/06;
(Continued)

(56) References Cited

U.S. PATENT DOCUMENTS 10,025,317 B2 * 7/2018 Batur .................... B60W 30/06
10,766,484 B2 * 9/2020 Bae .......................... G08G 1/14
(Continued)

FOREIGN PATENT DOCUMENTS

CA      3069417 A1   1/2020
CN    108351958 A    7/2018
(Continued)

OTHER PUBLICATIONS

Translation of JP-2016016681-A retrieved from Espacenet on Feb. 16, 2023 (Year: 2023).*
(Continued)

*Primary Examiner* — Thomas Ingram
*Assistant Examiner* — Faris Asim Shaikh
(74) *Attorney, Agent, or Firm* — Rankin, Hill & Clark LLP

(57) ABSTRACT

A parking assistance device includes a recognition part that is configured to acquire recognition information through recognition of surroundings of a host vehicle, a maneuver controller that is configured to perform maneuver control to park the host vehicle in a parking region based on the recognition information, a maintain stop position controller that is configured to keep the host vehicle stationary after the host vehicle is stopped by the maneuver control of the maneuver controller until a predetermined operation is received from a driver, a determination part that is configured to determine a type of the parking region in which the host vehicle is to be parked with the maneuver controller; and a decision part that is configured to determine, in accordance with the type of the parking region that is determined by the determination part, a parking reference location that is used to park the host vehicle in the parking region.

7 Claims, 13 Drawing Sheets

(51) Int. Cl.
  *B60W 30/095* (2012.01)
  *B60W 40/06* (2012.01)
  *B60W 10/18* (2012.01)
  *B60W 10/20* (2006.01)
  *B60W 10/06* (2006.01)
  *B60W 10/08* (2006.01)

(52) U.S. Cl.
  CPC ........ *B60W 30/0956* (2013.01); *B60W 40/06* (2013.01); *B60W 10/06* (2013.01); *B60W 10/08* (2013.01); *B60W 10/18* (2013.01); *B60W 10/20* (2013.01); *B60W 2420/42* (2013.01); *B60W 2420/54* (2013.01); *B60W 2552/53* (2020.02)

(58) Field of Classification Search
  CPC ...... B60W 10/06; B60W 10/08; B60W 10/18; B60W 10/20; B60W 2420/42; B60W 2420/54; B60W 2552/53; B62D 15/0285
  See application file for complete search history.

(56) References Cited

U.S. PATENT DOCUMENTS

| | | | | |
|---|---|---|---|---|
| 10,810,446 | B2* | 10/2020 | Hayakawa | G06T 7/136 |
| 2015/0138011 | A1* | 5/2015 | Hiramaki | G01S 17/931 367/99 |
| 2016/0362113 | A1* | 12/2016 | Takaso | G05D 1/0257 |
| 2018/0086381 | A1* | 3/2018 | Hoffman, Jr. | G05D 1/0225 |
| 2018/0099661 | A1* | 4/2018 | Bae | B62D 15/0285 |
| 2018/0164830 | A1* | 6/2018 | Moosaei | G05D 1/0246 |
| 2018/0354504 | A1* | 12/2018 | Kojo | G06V 10/44 |
| 2018/0370566 | A1* | 12/2018 | Kojo | B60R 21/00 |
| 2019/0039605 | A1* | 2/2019 | Iio | G06T 7/00 |
| 2019/0202447 | A1* | 7/2019 | Taniguchi | G05D 1/00 |
| 2020/0001864 | A1* | 1/2020 | Oyama | B60W 10/18 |
| 2020/0290600 | A1* | 9/2020 | Kuwahara | G06V 20/586 |
| 2020/0353866 | A1* | 11/2020 | Okubo | G06V 20/586 |
| 2020/0369262 | A1* | 11/2020 | Suzuki | B60R 11/04 |
| 2020/0398825 | A1* | 12/2020 | Tsujino | G08G 1/143 |

FOREIGN PATENT DOCUMENTS

| | | | | |
|---|---|---|---|---|
| CN | 108609010 A | * | 10/2018 | |
| CN | 110466503 A | | 11/2019 | |
| EP | 3690813 A1 | | 8/2020 | |
| JP | 2014-019305 A | | 2/2014 | |
| JP | 2016-016681 A | | 2/2016 | |
| JP | 2016016681 A | * | 2/2016 | ............... B60R 1/00 |
| JP | 2017-222309 A | | 12/2017 | |
| JP | 2018-130994 A | | 8/2018 | |
| JP | 2019-137079 A | | 8/2019 | |
| JP | 2019-167028 A | | 10/2019 | |
| WO | 2017104163 A1 | | 6/2017 | |
| WO | 2018047231 A1 | | 3/2018 | |
| WO | 2019/008757 A1 | | 1/2019 | |
| WO | 2019/064907 A1 | | 4/2019 | |

OTHER PUBLICATIONS

Translation of CN-108609010-A retrieved from Espacenet on Feb. 21, 2023 (Year: 2023).*
Office Action received in corresponding Japanese application No. 2019-225911 dated Sep. 7, 2021 with English translation (9 pages).
Chinese Office Action received in corresponding Chinese application No. 202011444538.3 dated Aug. 19, 2023 (7 pages).

* cited by examiner

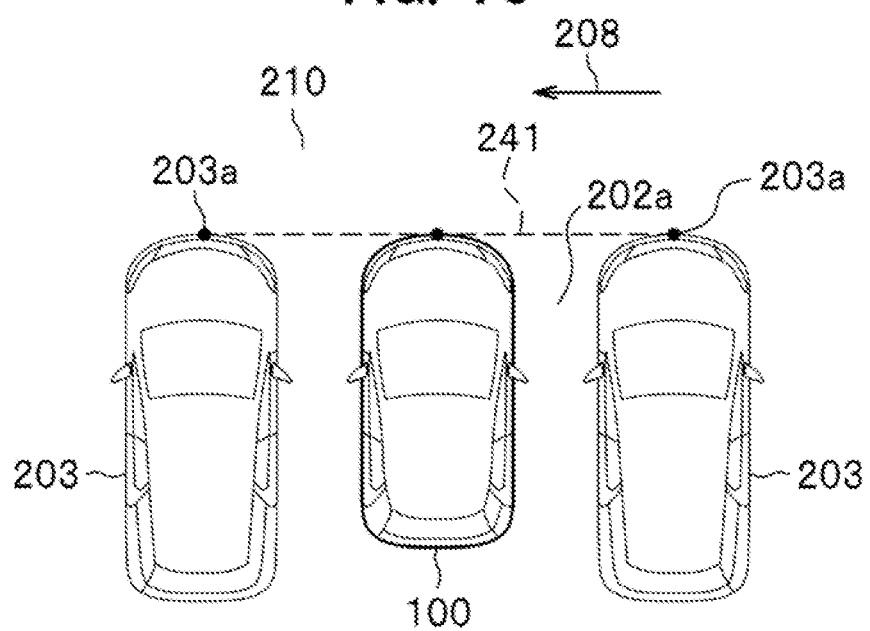

PARKING ASSISTANCE DEVICE, PARKING ASSISTANCE METHOD, AND COMPUTER PROGRAM PRODUCT

CROSS-REFERENCE TO RELATED APPLICATIONS

This application is based upon and claims the benefit of priority from Japanese Patent Application No. 2019-225911 filed Dec. 13, 2019, the entire contents of which are incorporated herein by reference.

BACKGROUND

Technical Field

The disclosure relates to a parking assistance device, parking assistance method, and computer program product.

Related Art

Patent Literature 1 (Japanese Unexamined Patent Application Publication No. 2016-016681) discloses a technology for detecting parking space boundary lines using an image captured with an imager of a vehicle.

Patent Literature 2 (Japanese Unexamined Patent Application Publication No. 2014-019305) discloses a technology to establish a parking location of a host vehicle by deriving a corner portion or center position of another vehicle when boundary lines separating a parking area are angled at an oblique angle (see paragraph 0042 and FIG. 5).

Patent Literature 3 (WO 2019/008757) discloses a technology for aligning a reference location of a host vehicle with a virtual line L by detecting front end portions of white lines W1 and W2 that separates a parking area (see FIG. 13A).

Patent Literature 4 (WO 2019/064907) discloses a technology for automatic parking when boundary lines separating a parking area are angled at an oblique angle.

However, there are parking areas with different types of parking regions. For example, some parking areas separate individual parking regions with boundary lines whereas some do not. And although with the technologies of Patent Literatures 1-4 a parking region is set as a parking target, these literatures do not disclose a technology for automatically parking a vehicle within a parking region at a parking location that is appropriate for each type of parking region.

SUMMARY

One aspect of the disclosure provides a parking assistance device including a recognition part configured to acquire recognition information through recognition of surroundings of a host vehicle, a maneuver controller configured to perform maneuver control to park the host vehicle in a parking region based on the recognition information, a maintain stop position controller configured to keep the host vehicle stationary after the host vehicle is stopped by the maneuver control of the maneuver controller until a predetermined operation is received from a driver, a determination part configured to determine a type of the parking region in which the host vehicle is to be parked with the maneuver controller, and a decision part configured to determine, in accordance with the type of the parking region that is determined by the determination part, a parking reference location that is used to park the host vehicle in the parking region. In response to determining that the type of the parking region is a demarcated parking region that is demarcated by at least left and right boundary lines, the decision part is configured to set the parking reference location to a location that is a first predetermined distance apart from a first virtual line joining front ends of the left and right boundary lines. In response to determining that the type of the parking region is a parking region that is not demarcated by the at least left and right boundary lines, the decision part is configured to set the parking reference location to a location based on a second virtual line joining front ends of other vehicles on a left and right of the parking region.

BRIEF DESCRIPTION OF DRAWINGS

FIG. 16 is a plan view of a parking region for explaining a parking reference location determination process that is executed by an automatic parking control unit according to at least one embodiment.

DETAILED DESCRIPTION

Figure 1:
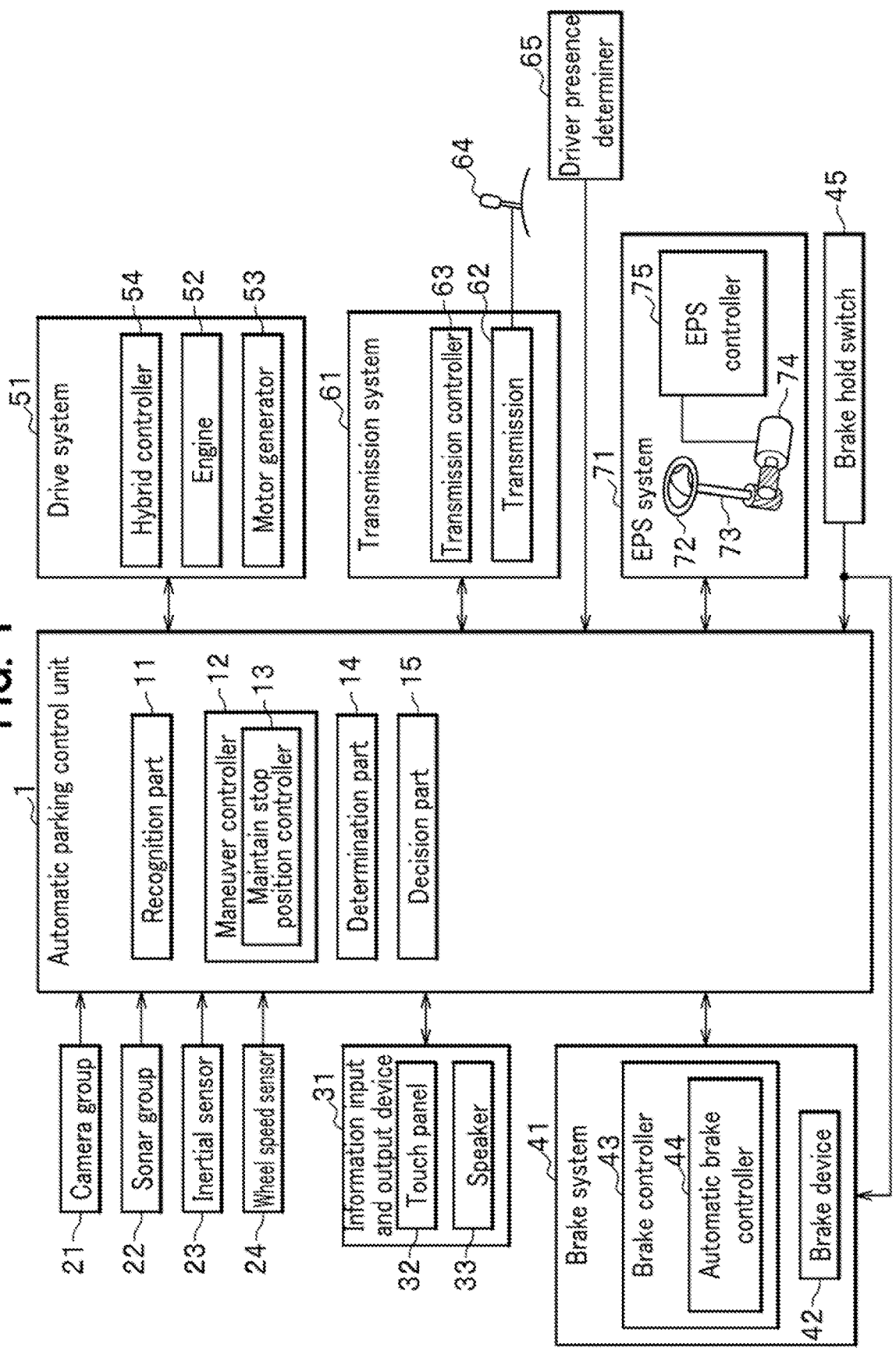
FIG. 1 is a block diagram of a system configuration in accordance with at least one embodiment centered on an automatic parking control unit according to at least one embodiment.

An object of the disclosure is to provide a parking assistance device that is able to perform automatic parking of a vehicle at an appropriate parking location in accordance with a type of a parking region where the vehicle is to park.

One aspect of the disclosure provides a parking assistance device that is configured to perform automatic parking of a vehicle at an appropriate parking location in accordance with a type of a parking region where the vehicle is to park.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments according to the disclosure is described below with reference to drawings. Directions to the front, back, left, and right referred to in the description are in accordance with the arrows shown in the drawings.

Figure 2:
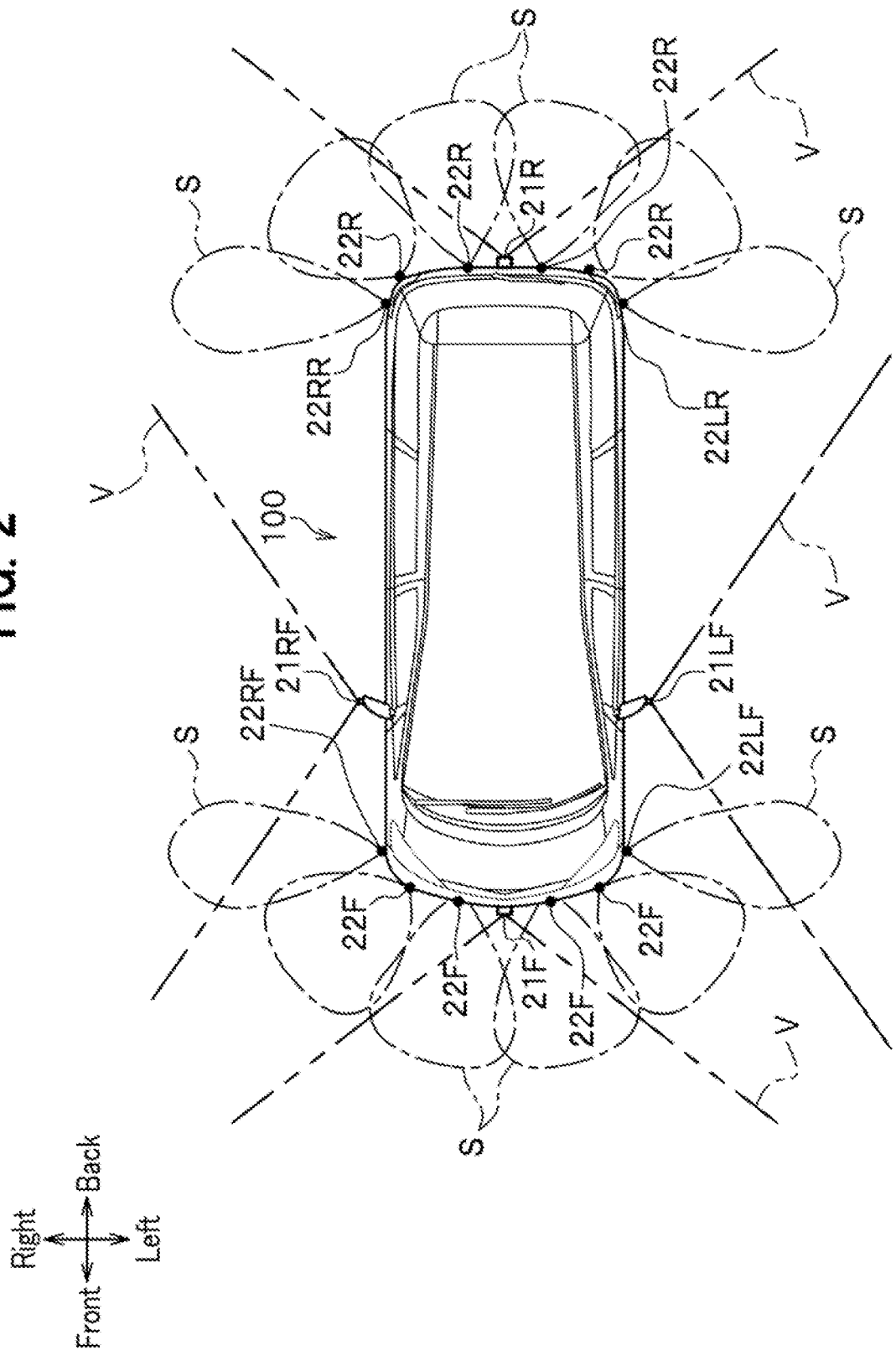
FIG. 2 is a top view of a vehicle installed with an automatic parking control unit according to at least one embodiment showing the positions of cameras and sonars installed on the vehicle.

FIG. 1 is a block diagram showing a system configuration of an embodiment centered on an automatic parking control unit 1. FIG. 2 is a top view of a host vehicle 100 equipped with the system of FIG. 1.

The automatic parking control unit 1 is an electronic control unit (ECU) for automatic parking that is installed on board a host vehicle 100. The automatic parking control unit 1 is an embodiment of a parking assistance device according to the disclosure and is configured mainly from a microcomputer and realizes the functions of the following various control parts through executing a process based on a control program. The automatic parking control unit 1 operates based on a program characteristic to the disclosure and carries out a parking assistance method according to the disclosure through execution of the process of the program. A recognition part 11 acquires recognition information including image data and sonar data by recognizing the surroundings with a camera group 21 and sonar group 22 (the camera group 21 and sonar group 22 are described later). Based on this recognition information, a maneuver controller 12 performs maneuver control for the automatic parking of the host vehicle 100 in a parking region by maneuvering the host vehicle 100 into the parking region using the following systems (described in detail later). The maneuver control controls a brake system 41, a drive system 51, a transmission system 61, and an EPS system 71 based on information including detection results of an inertial sensor 23, a wheel speed sensor 24, and a driver presence determiner 65 and an operation result of a brake hold switch 45. A "parking region" refers to a region for parking the host vehicle 100. For example, for a parking space whose boundary is delineated by a boundary line, a parking region is the parking space for a single vehicle that is demarcated by the boundary line. The maneuver controller 12 includes a maintain stop position controller 13. The maintain stop position controller 13 maintains the host vehicle 100 at the same location from when the host vehicle 100 stops through maneuver control of the host vehicle 100 by the maneuver controller 12 to when a predetermined operation from the driver is received. The determination part 14 determines the type of a parking region where the host vehicle 100 is to be parked by the maneuver controller 12. A "type of a parking region" may refer, for example, to a parking region among a number of parking regions arranged next to one another and demarcated by left and right boundary lines, or a parking region without left and right boundary lines (i.e., a parking region that is not separated from an adjacently parked vehicle with a demarcation). The decision part 15 determines a parking reference location for the automatic parking of the host vehicle 100 in a parking region according to the type of the parking region as determined by the determination part 14. A "parking reference location" refers to a location that is used as reference when deciding a location of the front end or rear end of the host vehicle 100 when parking the host vehicle 100 in a parking region. The operations executed by the recognition part 11, maneuver controller 12, maintain stop position controller 13, determination part 14, and decision part 15 will be described in detail later.

The automatic parking control unit 1 is connected to a camera group 21 and sonar group 22. In some embodiments, each component that is connected to the automatic parking control unit 1 (with the connection as indicated by a line in the drawing of FIG. 1) has a wire connection with the automatic parking control unit 1. In some embodiments, each component connected to the automatic parking control unit 1 has a connection via a Controller Area Network (a CAN).

The camera group 21 is a group of cameras that the host vehicle 100 is installed with as shown in FIG. 2. The host vehicle 100 is equipped at the front thereof with a front camera 21F that captures an image of a view in front of the host vehicle 100. Furthermore, the host vehicle 100 is equipped at the rear thereof with a rear camera 21R that captures an image of a view at the back of the host vehicle 100. Yet further, the host vehicle 100 is equipped on the right side thereof towards the front with a side camera 21RF that captures an image of a view to the right of the host vehicle 100. Yet further, the host vehicle 100 is equipped on the left side thereof towards the front with a side camera 21LF that captures an image of a view to the left of the host vehicle 100. In some embodiments, the side cameras 21RF and 21LF are each installed at the tip of a side mirror or away from a side mirror to prevent the side mirrors from obstructing the views that are captured by the cameras. In some embodiments, the side cameras 21RF and 21LF are each installed some distance away from a side mirror.

The sonar group 22 is a group of cameras that the host vehicle 100 is installed with as shown in FIG. 2. The host vehicle 100 is equipped at the front thereof with four front sonars 22F that are arranged apart at substantially equal intervals. The four front sonars 22F detect an obstacle in front of the host vehicle 100. Furthermore, the host vehicle 100 is equipped at the rear thereof with four rear sonars 22R that are arranged apart at substantially equal intervals. The four rear sonars 22R detect an obstacle at the back of the host vehicle 100. The front sonars 22F detect an obstacle in the direction of travel when the host vehicle 100 is moving forward. The rear sonars 22R detect an obstacle in the direction of travel when the host vehicle 100 is moving in reverse.

Furthermore, the host vehicle 100 is equipped with a single side sonar 22RF on a front portion of the right side of the host vehicle 100. The side sonar 22RF detects an obstacle at the front right of the host vehicle 100 to the right of the host vehicle 100. Yet further, the host vehicle 100 is equipped with a single side sonar 22LF on a front portion of the left side of the host vehicle 100. The side sonar 22LF detects an obstacle at the front left of the host vehicle 100 to the left of the host vehicle 100. Yet further, the host vehicle 100 is equipped with a single side sonar 22RR on a back portion of the right side of the host vehicle 100. The side sonar 22RR detects an obstacle at the back right of the host vehicle 100 to the right of the host vehicle 100. Yet further, the host vehicle 100 is equipped with a single side sonar 22LR on a back portion of the left side of the host vehicle 100. The side sonar 22LR detects an obstacle at the back left of the host vehicle 100 to the left of the host vehicle 100. Each of the side sonars 22RF, 22LF, 22RR, and 22 LR detects an obstacle that may come in the path of the host vehicle 100. In FIG. 2, a broken line S indicates a spatial range where the individual sonars detect an obstacle. The broken line V indicates a range of view of individual cameras.

Note that the number of cameras and sonars and their installed locations are not limited to the description given above. The number of cameras and sonars may be increased or decreased. The locations of the cameras and sonars may be changed. In some embodiments, the numbers and locations of one or more cameras and one or more sonars may be selected so that the situation around the circumference of the host vehicle 100 is detectable.

In some embodiments, a sensor other than a camera or a sonar is used to detect the surrounding situation of the host vehicle 100. For example, the host vehicle 100 may be equipped with a radar. The radar includes a function to acquire distribution information of a target by irradiating a target with a radar wave and receiving a radar wave reflected from the target, the target including another vehicle driving in front of the host vehicle 100, and the distribution information of the target including a distance to the target and a direction of the target. For the radar wave, a laser, a microwave, a millimeter-wave, or an ultrasonic wave may for example be used as deemed appropriate.

In some embodiments, the host vehicle 100 is equipped with a LIDAR (Light Detection and Ranging). The LIDAR includes, for example, a function to detect a presence of a target and a distance to the target by measuring the time taken to detect scattered light in response to irradiation of light.

In the description that follows, an example is used where the host vehicle 100 detects its surrounding area through a combined used of the camera group 21 and sonar group 22.

Referring back to FIG. 1, the automatic parking control unit 1 is connected to an inertial sensor 23 and a wheel speed sensor 24. The inertial sensor 23 is a sensor that detects the acceleration of the host vehicle 100. The wheel speed sensor 24 is a sensor that detects the wheel speed of each of the wheels of the host vehicle 100.

Furthermore, the automatic parking control unit 1 is connected to an information input and output device 31. The information input and output device 31 includes a touch panel 32 and a speaker 33. The main body of the information input and output device 31 is arranged in the vicinity of a driver's seat to allow the driver to operate, for example, the touch panel 32. The information input and output device 31 may display various information on the touch panel 32, output various audio output with the speaker 33, and accept various operations through the touch panel 32.

In other words, through the use of the information input and output device 31, car navigation information that has been prepared, for example, based on information from a satellite navigation system, may be displayed on the touch panel 32 or output as audio from the speaker 33 or both. This car navigation information may also include information received from the Vehicle Information and Communication System (VICS [a registered trademark]).

Furthermore, the information input and output device 31 may receive TV and radio broadcast and display images on the touch panel 32 and output audio from the speaker 33. Yet further, the information input and output device 31 may include an optical disc drive (not shown) and read data from media such as a CD (a compact disc), DVD (a digital versatile disc or digital video disc), and BD (a Blu-ray Disc). Yet further, the information input and output device 31 may include an HDD (a hard disk drive, not shown) and play music recorded thereon.

Yet further, the information input and output device 31 may be used to output various messages from the host vehicle 100 or a device installed on the host vehicle 100 (e.g., an ETC [Electronic Toll Collection] in-vehicle device) and accept various operations for the installed device.

The automatic parking control unit 1 is connected to a brake system 41. The brake system 41 is a system for performing the braking of the host vehicle 100. The brake system 41 includes a brake device 42 that performs the braking of the host vehicle 100 and a brake controller 43 that controls the brake device 42. The brake controller 43 includes a function of an automatic brake hold controller 44. The automatic brake hold controller 44 realizes an automatic brake hold control part. The brake device 42 generates hydraulic pressure (oil pressure) thereby supplying hydraulic pressure to a wheel cylinder of each wheel to generate friction braking force. Note that the brake system 41 may use a regenerative brake in conjunction when the host vehicle 100 is, for example, a hybrid vehicle. The brake device 42 is, for example, a device where a brake-by-wire system is applied. Therefore, the brake device 42 may generate braking force irrespective of a brake pedal operation (a brake pedal is not shown in drawings). Furthermore, the brake device 42 may be a system installed with an electric brake booster. In this case, braking force may be generated with the electric brake booster irrespective of a brake pedal operation. The brake controller 43 is a controller for controlling the brake device 42.

The automatic brake hold controller 44 is a function that is included as part of the brake controller 43 and controls an automatic brake hold function. The automatic brake hold function is a function for maintaining a braking state of the host vehicle 100 when the driver releases his foot from a brake pedal (not shown) after the brake pedal has been pressed. Note that with the automatic brake hold function, the host vehicle 100 is released from the automatic brake hold state when a predetermined condition is met, such as when an accelerator pedal (not shown) is operated. The automatic brake hold state may be turned on and off by operating a brake hold switch 45 installed close to the driver's seat of the host vehicle 100.

The automatic parking control unit 1 is connected to a drive system 51. The drive system 51 is a system to drive the host vehicle 100. In the given example, the host vehicle 100 is a hybrid vehicle that includes as its driving source an engine 52 and a motor generator 53. A hybrid controller 54 drives the host vehicle 100 by controlling the engine 52 and motor generator 53. Note that the host vehicle 100 is not limited to a hybrid vehicle. When, for example, the host vehicle 100 is a gasoline-powered vehicle, the engine 52 is the driving source. When, as another example, the host vehicle 100 is an electric vehicle including a fuel-cell vehicle, a motor is the driving source.

A transmission system 61 is a system for carrying out gear changes of the host vehicle 100. The transmission system 61 includes a transmission 62 that performs a gear change of the host vehicle 100, a transmission controller 63 that controls the transmission 62, and a gearshift 64 that is connected to the transmission 62. The transmission 62 may be an automatic transmission or a manual transmission. With the transmission system 61 described here, a gear change may be carried out without driver operation and through the transmission controller 63 controlling the transmission 62, in which case the transmission controller 63 moves the position of the gearshift 64 in accordance with the gear change.

The automatic parking control unit 1 is connected to a driver presence determiner 65. The driver presence determiner 65 determines whether a driver is present in the driver's seat.

The automatic parking control unit 1 is connected to an electric power steering system 71 (an EPS system 71). The EPS system 71 is a system configured to assist the steering of a driver. The EPS system 71 includes a steering axle 73 with a steering wheel 72, a drive motor 74 that drives the rotation of the steering axle 73, and an EPS controller 75 that controls the drive motor 74. The EPS system 71 rotates the steering axle 73 using the drive motor 74 as a driving source thereby assisting the steering operation of the driver turning the steering wheel 72.

Next, the effect of the system centered on the automatic parking control unit 1 is described.

In the subsequent description, the phrase "automatic parking operation" refers to a series of operations described in the flowcharts of FIGS. 4 and 5 (described later) that involves the automatic parking control unit 1 performing automatic operation of the host vehicle 100 through the control of individual systems and driving the host vehicle 100 to perform automatic parking. The phrase "automatic parking function" refers to the entire process indicated by the flowcharts of FIGS. 4 and 5 concerning automatic parking that the automatic parking control unit 1 takes a central role executing (note that the entire process includes the "automatic parking operation").

Figure 3A:
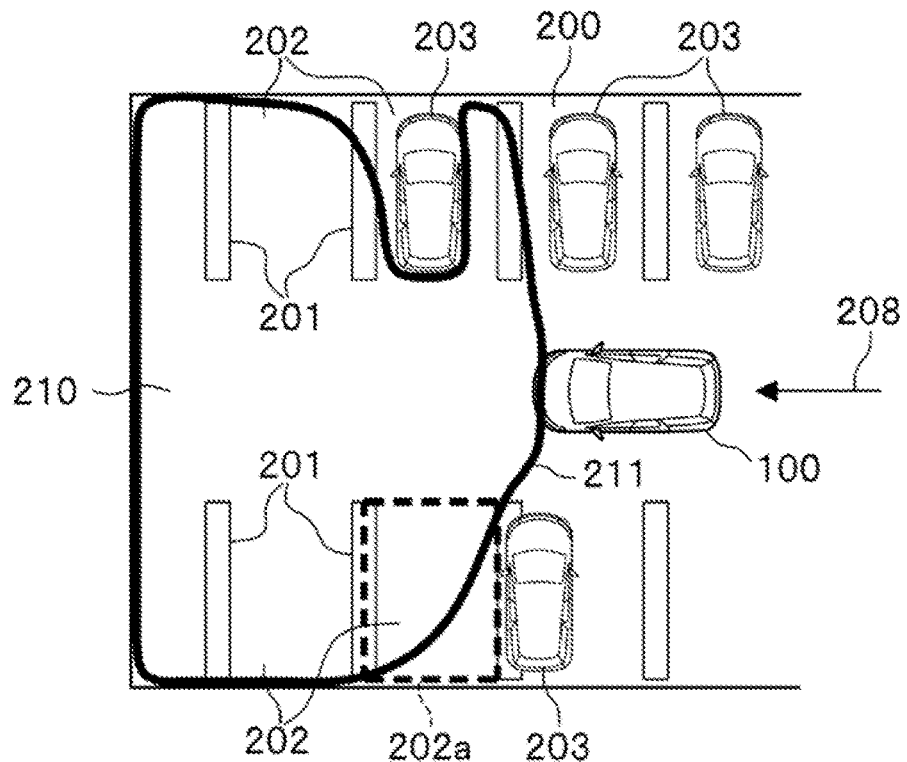
FIG. 3A is a top view of a parking area for explaining a situation where a vehicle installed with an automatic parking control unit according to at least one embodiment searches for a space to perform a parking maneuver.
Figure 3B:
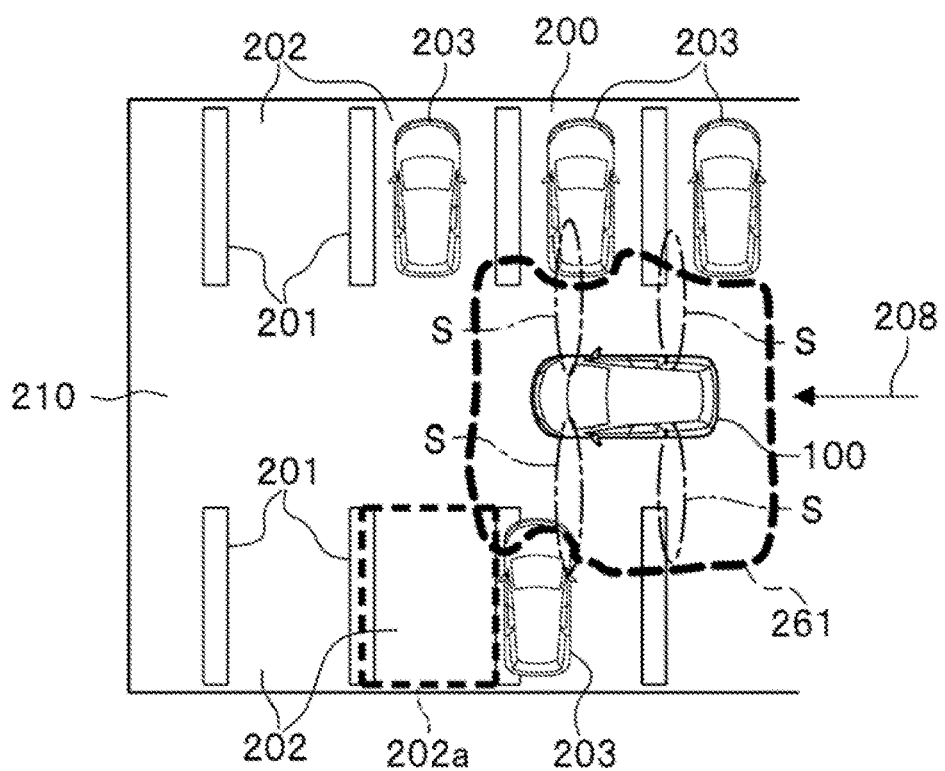
FIG. 3B is a top view of a parking area for explaining a situation where a vehicle installed with an automatic parking control unit according to at least one embodiment searches for a space to perform a parking maneuver.
Figure 3C:
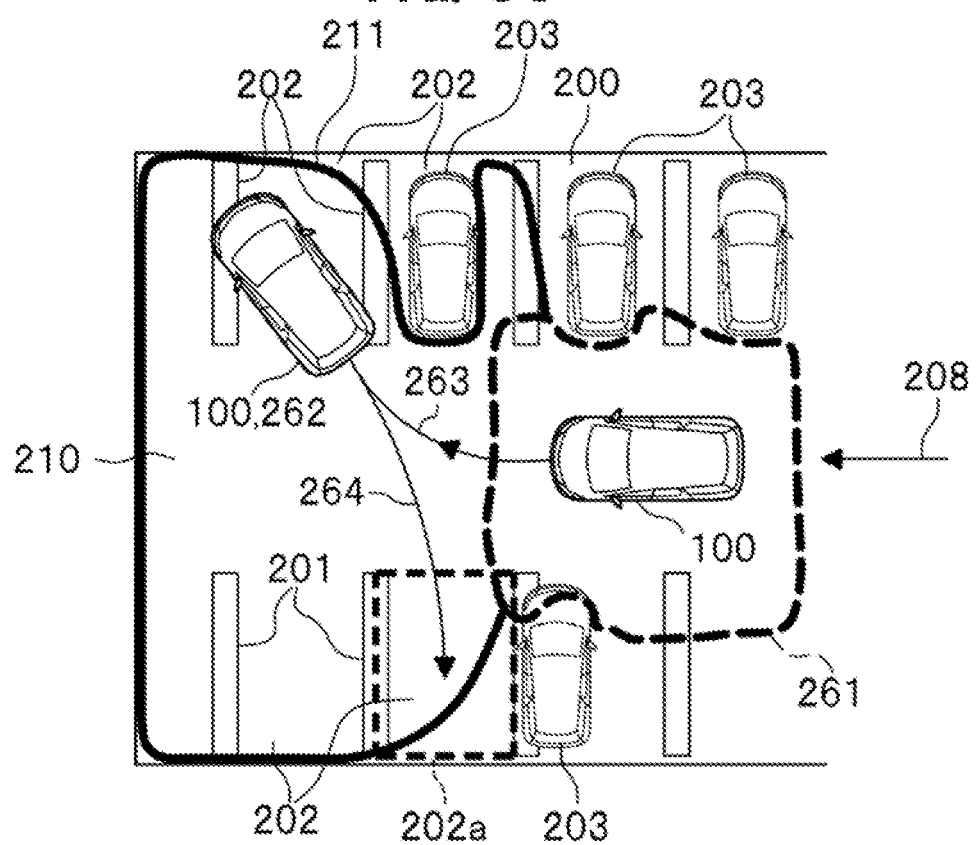
FIG. 3C is a top view of a parking area for explaining a situation where a vehicle installed with an automatic parking control unit according to at least one embodiment searches for a space to perform a parking maneuver.

The automatic parking control unit 1 carries out the control of automatic parking. To do this, the automatic parking control unit 1 detects a space to perform a parking maneuver in a place such as a parking area by using the camera group 21 and sonar group 22. FIGS. 3A-3C are top views of the host vehicle 100 for explaining a situation where the host vehicle 100 searches for a space to perform a parking maneuver.

FIG. 3A is a top view showing a situation where the host vehicle 100 searches for a space to carry out a parking maneuver in a parking area 200 through the use mainly of the front camera 21F of the camera group 21. To the host vehicle 100 that has entered the parking area 200, there are multiple parking spaces 202 (parking regions) separated by white lines 201 (boundary lines) that are arranged on the left and right. Some parking spaces 202 are already in use by other vehicles 203 but some are vacant. A driver of the host vehicle 100 drives the host vehicle 100 to advance slowly along a way 210 of the parking area 200 in a direction of travel 208. Although the parking area 200 of the drawing shows parking spaces 202 on both sides of the way 210, there are cases where parking spaces 202 are available on one side and not on the other.

From an image captured by the front camera 21F (FIG. 2), a region 211 may be recognized as a space that is available for the host vehicle 100 to perform a parking maneuver. By performing predetermined image processing on the image captured by the front camera 21F, a difference in luminance levels may be recognized, and in this way, the host vehicle 100 may recognize the region 211 that is available for use to perform a parking maneuver. Camera recognition is good at recognizing a white line 201. Camera recognition also includes a space recognition function. However, camera recognition is not good at recognizing objects such as snow, a white wall, and another vehicle close by. For this reason, control of the brake to avoid colliding with obstacles when performing automatic parking is difficult with only the image captured by the front camera 21.

The sonar group 22 is therefore used in combination. FIG. 3B is a top view showing a situation where all the sonars of the sonar group 22 are used to search for a space to perform a parking maneuver in the parking area 200. Sonars are capable of detecting an obstacle by transmitting and receiving sound waves and, in comparison to a camera, is good at detecting an obstacle close by. Therefore, a sonar may be used to accurately perform brake control against an obstacle. Furthermore, because a sonar has a higher space recognition function than a camera, the sonar group 22 is useful when deriving various parking patterns. FIG. 3B shows a region 261 that is available for use when performing a parking maneuver as recognized by the sonar group 22.

FIG. 3C is a top view showing both the region 211 and region 261. Through the combined use of the front camera 21F and sonar group 22, a wide space may be recognized as a space available for use to perform a parking maneuver. Furthermore, the combined use enables a better brake control for avoiding an obstacle. In the example of FIG. 3C, a parking space 202a is decided as a parking region in which the host vehicle 100 is to park through automatic parking. A space further down on the right as viewed from the host vehicle 100 is unoccupied and this location is decided as a location (a "change-to-reverse location") where the host vehicle 100 stops before moving in reverse. The example shows how the host vehicle 100 may be parked through automated parking by (a) moving and steering the host vehicle 100 forward to the right (as shown by an arrow 263), (b) stopping the host vehicle 100 temporarily at the change-to-reverse location 262, and (c) turning back the steering wheel and moving the host vehicle 100 in reverse so that the host vehicle 100 enters the parking space 202a (a parking region) (as shown by an arrow 264).

The above has been an outline of automated parking in which the front camera 21F is used in combination with the sonar group 22. A detailed description of a process of automated parking now follows.

Figure 4:
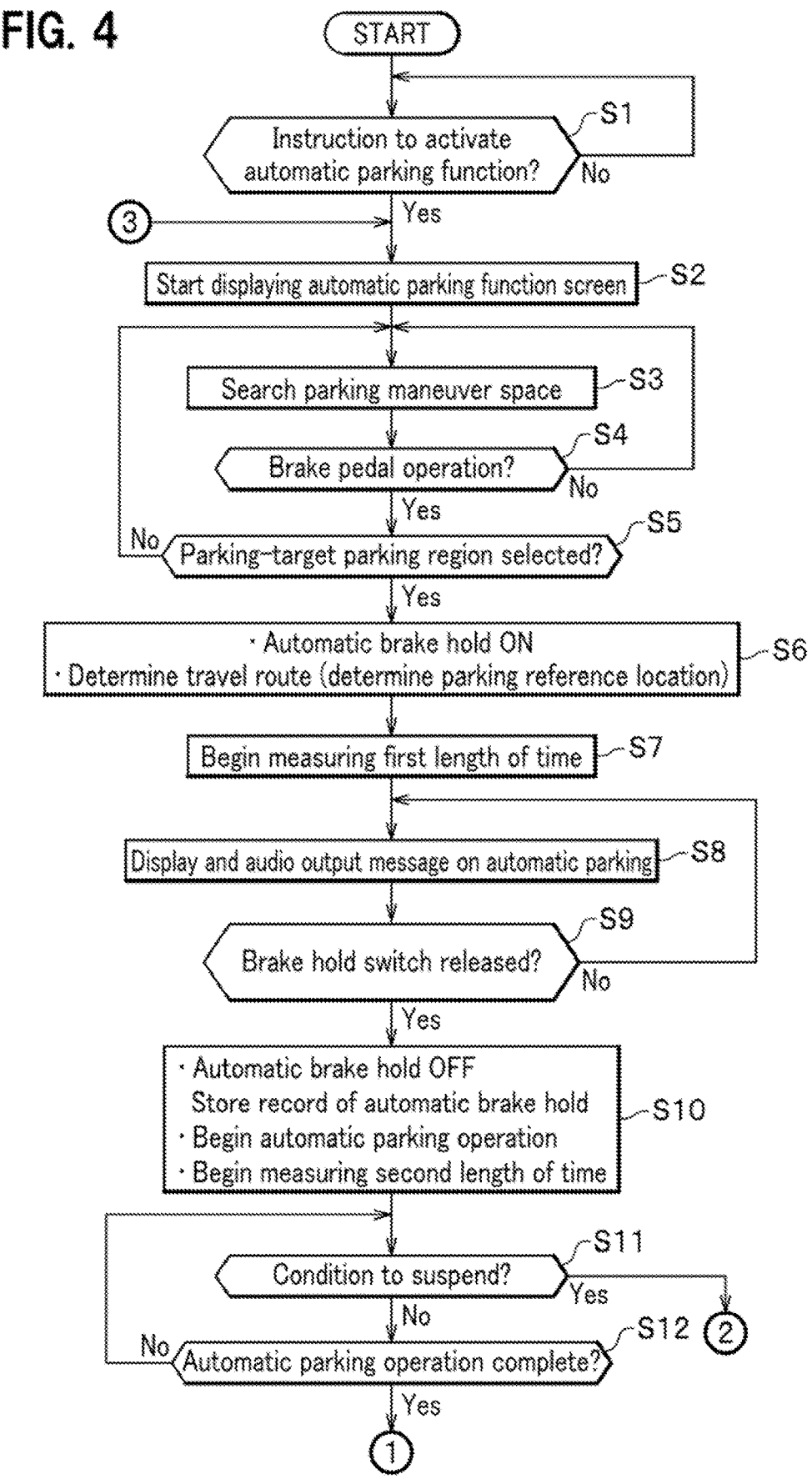
FIG. 4 is a flowchart for explaining a process executed by an automatic parking control unit according to at least one embodiment.
Figure 5A:
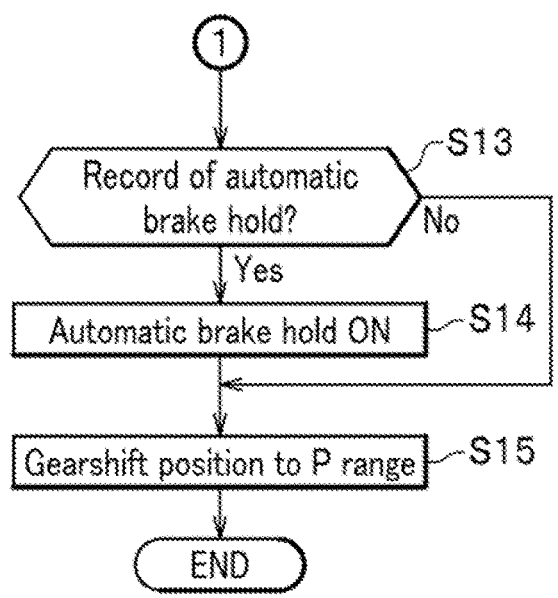
FIGS. 5A and 5B are flowcharts for explaining a process executed by an automatic parking control unit according to at least one embodiment.
Figure 5B:
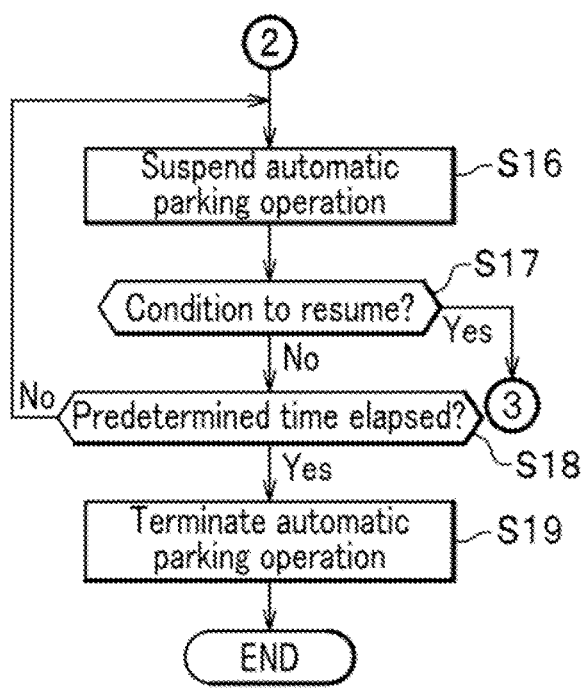

FIGS. 4, 5A, and 5B are flowcharts that explain a process carried out by the automatic parking control unit 1. FIGS. 6-9 are top views of a parking area for describing the process that the automatic parking control unit 1 carries out. Note that the flowcharts illustrate an outline of a series of operational steps described below and does not include every detail of the operational steps that the automatic parking control unit 1 performs. Operations not included in the flowcharts are included in the below description as deemed appropriate.

Figure 6:
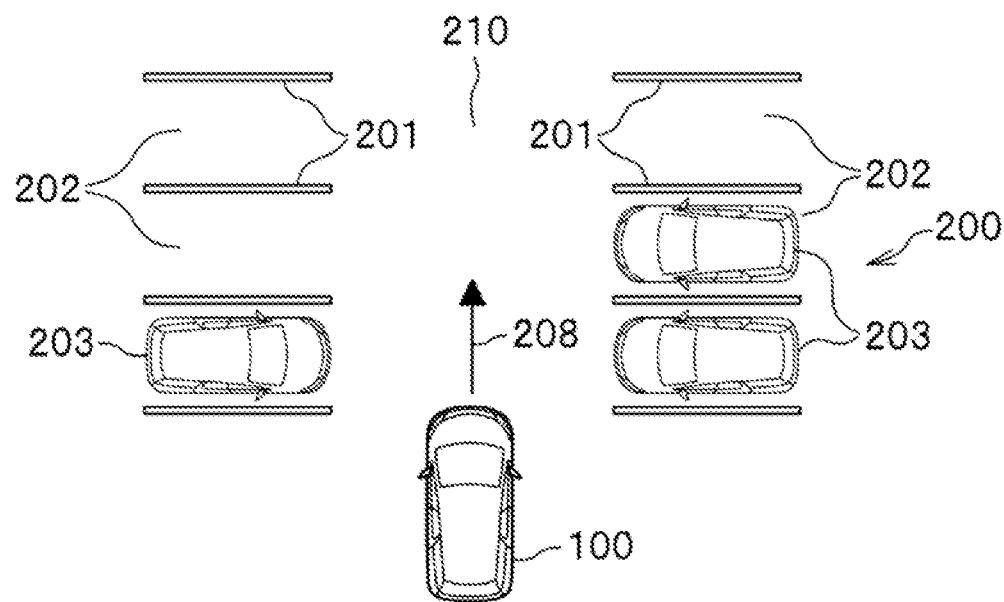
FIG. 6 is a top view of a parking area for explaining a process executed by an automatic parking control unit according to at least one embodiment.

To begin with, as shown in FIG. 6, a driver of the host vehicle 100 drives the host vehicle 100 into a parking area 200 as shown by an arrow indicating a direction of travel 208. During this time, the driver instructs the automatic parking function to be activated by, for example, operating the touch panel 32 ("Yes" of S1). The instruction to activate the automatic parking function is received by the maneuver controller 12. Upon receiving the instruction, the maneuver controller 12 displays a predetermined screen for the automatic parking function on the touch panel 32 (S2). Note that during the series of operational steps, various types of automatic parking function screens are displayed as deemed appropriate.

The recognition part 11 makes a combined use of the front camera 21F and the sonar group 22 with a method such as that described above with reference to FIGS. 3A-3C. The recognition information acquired by the recognition part 11 is used by the maneuver controller 12 to search for a parking maneuver space that the host vehicle 100 is able to use when performing a parking maneuver (S3).

Figure 7:
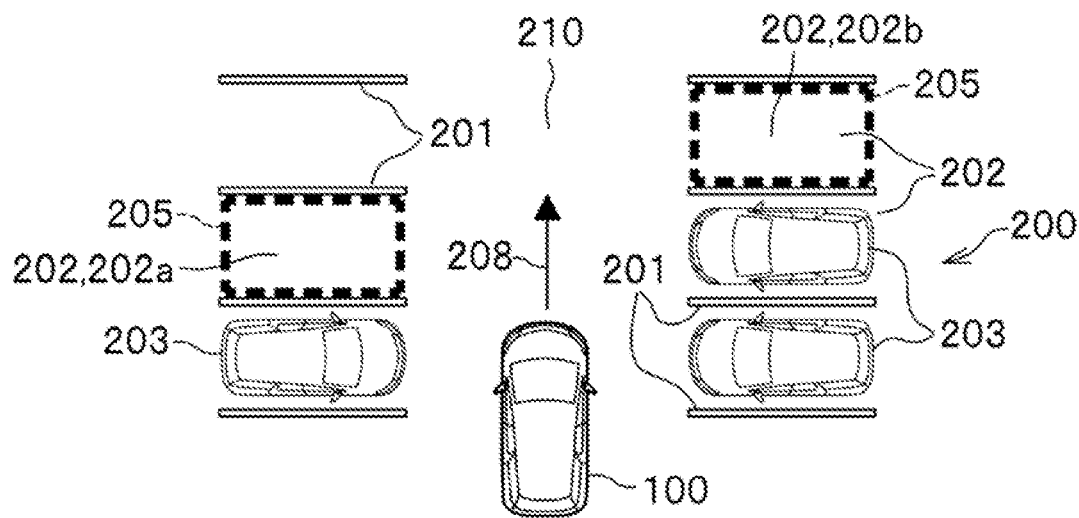
FIG. 7 is a top view of a parking area for explaining a process executed by an automatic parking control unit according to at least one embodiment.

Furthermore in S3, based on the result of the search, the following operations are carried out. First, the maneuver controller 12 determines a parking region (a parking space 202) where the host vehicle 100 is possible to park. In the example of FIG. 7, parking spaces 202*a* and 202*b* are candidates for a parking-target parking region. Furthermore, based on the detection results of the front camera 21F and sonar group 22, the maneuver controller 12 calculates paths that avoid an obstacle for the host vehicle 100 to park in the parking space 202*a* and in the parking space 202*b*.

Next, the maneuver controller 12 estimates the current location of the host vehicle 100 based on the detection results of the inertial sensor 23 and wheel speed sensor 24. Using this location as reference, the maneuver controller 12 calculates each of the target movement paths of the host vehicle 100 to park in the parking space 202*a* and in the parking space 202*b*. The maneuver controller 12 provides a display on the touch panel 32 of relative locations of the host vehicle 100 and the parking spaces 202*a* and 202*b* such as that shown in FIG. 7. For ease of recognition by the driver, the parking spaces 202*a* and 202*b* are indicated on a displayed image with a mark such as a frame 205.

Since the "Yes" of S1, the driver has been driving the host vehicle 100 to move through the parking area 200, and during this time the operations of S3 continue to be performed ("No" of S4). However, when the brake pedal (not shown) is operated by the driver ("Yes" of S4) and the host vehicle 100 stops, the maneuver controller 12 performs the following operations. When the driver operates the touch panel 32 and selects one candidate (in this example, the parking space 202*a* or 202*b*) as the parking-target parking region ("Yes" of S5), the maneuver controller 12 determines that the selected candidate is the parking-target parking region. The selection may, for example, be carried out by touching a region indicated by a frame 205 mentioned above. When the selection is not made ("No" of S5), the abovementioned operations of S3 are continued. Note that the operational steps of S4 and S5 may be reversed in order.

Figure 8:
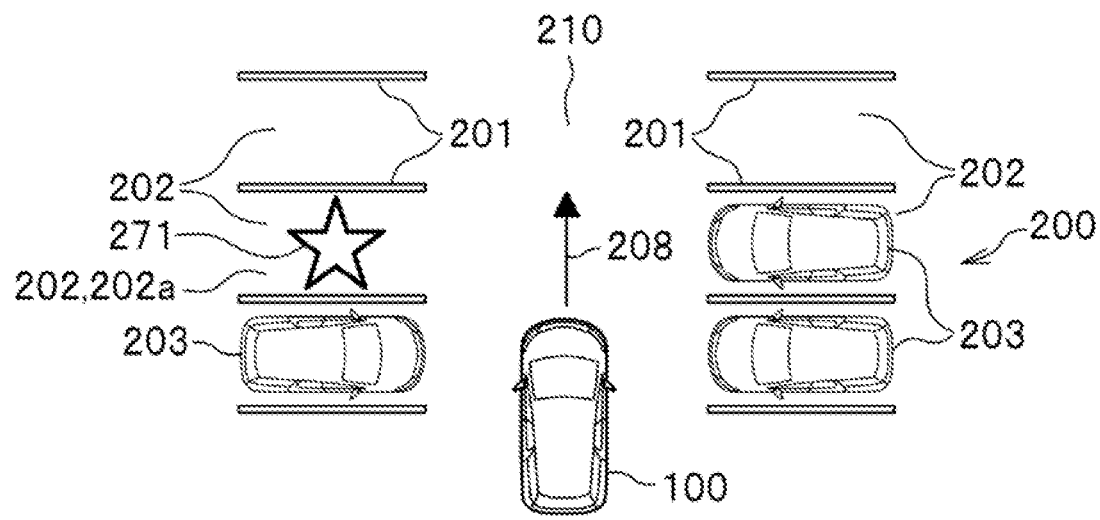
FIG. 8 is a top view of a parking area for explaining a process executed by an automatic parking control unit according to an embodiment.

When the parking-target parking region is determined as above ("Yes" of S5), the maneuver controller 12 displays a mark 271, such as the one shown in FIG. 8, on an image of the parking region (in this example, the parking space 202*a*) displayed on the touch panel 32.

The maintain stop position controller 13 instructs the automatic brake hold controller 44 to turn on the automatic brake hold function (S6). As a result of turning on the automatic brake hold function, the brake state of the host vehicle 100 is automatically maintained when a foot of the driver is removed from the brake pedal (not shown).

Furthermore, a travel route indicated by arrows 263 and 264 in FIG. 3C and a change-to-reverse location indicated by the number "262" also in FIG. 3C are determined by the determination part 14 and decision part 15. When the travel route and change-to-reverse location are determined, a parking reference location for the parking-target parking region that was selected in S5 is determined (S6). The determination process of the parking reference location is described later.

Subsequently, the maneuver controller 12 starts measuring an elapsed time, a first length of time, with a timer (S7). Then, the maneuver controller 12 displays a message on automatic parking on the touch panel 32 and outputs an audio message with the speaker 33 (S8). In some embodiments, the message on automatic parking is output on the touch panel 32 only. The message notified to the driver contains information to the following effect: "The automatic brake hold has been turned on. To begin automatic parking, press the brake hold switch, release your hands from the steering wheel, and remove your foot from the brake pedal".

If the driver follows all the instructions given in the message, the brake hold switch 45 will be pressed thereby releasing the brake hold switch 45 (i.e., the brake hold switch 45 will be released from a "pressed" state; "Yes" of S9). When the brake hold switch 45 is not released ("No" of S9), the abovementioned message continues to be displayed on the touch panel 32.

Note that when a predetermined operation is performed during the operational steps S2-S8 that have been described, the series of operational steps for automatic parking is terminated. This may occur, for example, when the driver operates the automatic parking function screen displayed on the touch panel 32 to terminate the operation of the automatic parking function, or when the driver intentionally operates the gearshift 64.

When the brake hold switch 45 is released ("Yes" of S9), the operations of S10 are carried out. That is, the maintain stop position controller 13 instructs the automatic brake hold controller 44 to turn off the automatic brake hold function (S10). This causes the brake on the host vehicle 100 to be released. Furthermore, the maintain stop position controller 13 stores a record of operation of the automatic brake hold function in S6 in storage such as a non-volatile memory (S10). Yet further, the maneuver controller 12 starts the automatic parking operation (S10). (Details of the automatic parking operation is described later.) Yet further, the maneuver controller 12 starts measuring another elapsed time, a second length of time, with a timer (S10). Note that when the brake pedal (not shown) is not released, the maneuver controller 12 performs control as follows. Even when the brake hold switch 45 is released (S9), the maneuver controller 12 does not start the automatic parking operation (S10). The automatic brake hold function (S6) remains turned on.

Figure 9:
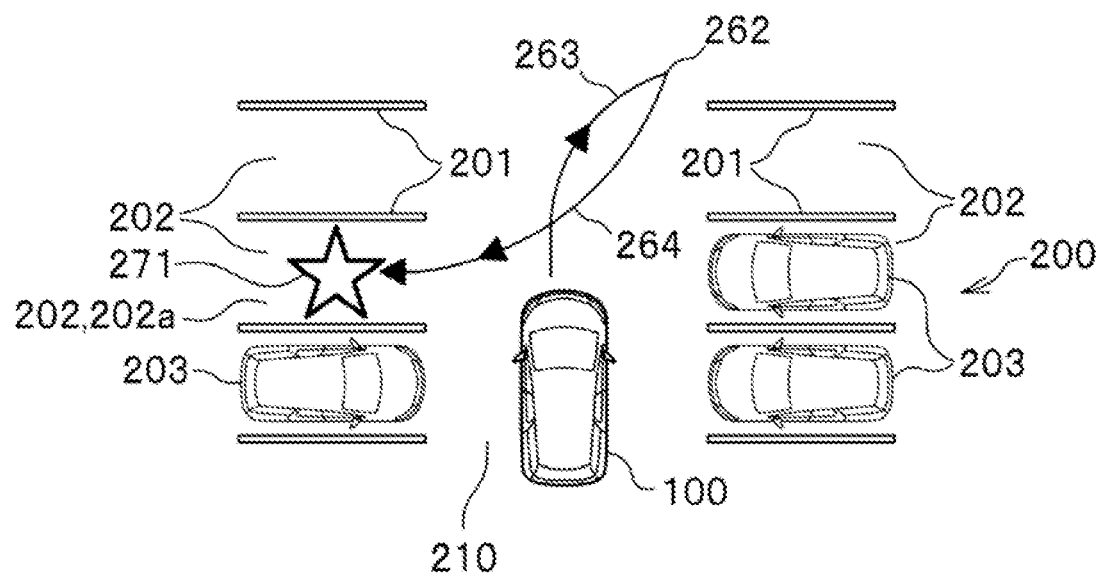
FIG. 9 is a top view of a parking area for explaining a process executed by an automatic parking control unit according to at least one embodiment.

The automatic parking operation started by the maneuver controller 12 includes the following operations. As shown in FIG. 9, the maneuver controller 12 controls the host vehicle 100 to travel along the target movement path that has been decided in S3. That is, the maneuver controller 12 controls the brake system 41, drive system 51, transmission system 61, and EPS system 71. Through this control, the host vehicle 100 reverse parks in the parking space 202*a*, the parking-target parking region.

Described in more detail, the maneuver controller 12 controls these systems so that the host vehicle 100 travels forward in D range as shown by the arrow 263 until the change-to-reverse location 262 is reached, at which point the host vehicle 100 stops temporarily. Next, the maneuver controller 12 controls these systems so that the host vehicle 100 (i) travels backwards in R range and into the parking space 202*a*, the parking-target parking region, and (ii) stops when the host vehicle 100 has entered the parking space 202*a*.

Once the automatic parking operation has been started (S10), whether a condition to suspend the automatic parking function has been met while the automatic parking operation is taking place is determined (S11).

In S11, an operation of the steering wheel 72 is one action that meets the condition to suspend the automatic parking function and a shifting of the gearshift 64 to the N range is another action that meets the condition to suspend the automatic parking function.

Furthermore, in S11, the maneuver controller 12 determines whether the first length of time, whose measurement started in S7, has reached a predetermined length of time. The first length of time is a period of time from when the parking-target parking region is decided (S5, S7) to when the operation to remove the automatic brake hold with the brake hold switch 45 is received ("Yes" of S9). The condition to suspend the automatic parking function is also met if the first length of time is equal to or greater than the predetermined length of time. Yet further, in S11, the maneuver controller 12 determines whether the second length of time whose measurement started in S10 has reached a predetermined length of time. The second length of time is a period of time from when the brake hold switch 45 is operated ("Yes" of S9) to when a released state of the brake pedal (not shown) is detected. The condition to suspend the automatic parking function is also met if the second length of time is equal to or greater than the predetermined length of time.

Furthermore, the condition to suspend the automatic parking function is also met if, through the driver presence determiner 65, it is determined that a driver seat is without a driver. The driver presence determiner 65 may be configured from a device such as a seating sensor that detects whether a driver is seated in the driver's seat, an on-board camera that takes an image of the vehicle interior (the presence of a seated driver may be determined through image processing), or a door-opening sensor that detects whether the door next to the driver's seat is opened or closed. Yet further, various other conditions under which suspending the automatic parking function is considered sensible may be used as a criterion to meet the condition to suspend the automatic parking function.

When the automatic parking operation is completed with the condition to suspend the automatic parking function not being met ("Yes" of S12), a message to notify the completion of the automatic parking operation is output through the touch panel 32, speaker 33, or the like. The next operational step becomes S13. If the condition to suspend the automatic parking function has been met during the automatic parking operation ("No" of S12), the next operational step becomes S16. The automatic parking operation is complete ("Yes" of S12) when the host vehicle 100 comes to a stop inside the parking-target parking region (in this example, the parking space 202*a*). The location within the parking region where the host vehicle 100 stops is based on the parking reference location determined in S6.

In S13, the maneuver controller 12 determines whether a record of an automatic brake hold operation has been stored in S10. If there is a stored record of an automatic brake hold operation ("Yes" of S13), the brake system 41 is controlled to turn on the automatic brake hold function once again. The operational step then advances to S15. Therefore, even if the driver is not pressing down on the brake pedal (not shown), the host vehicle 100 is applied with a brake and stops. If there is no stored record ("No" of S13), the process advances to S15. In this case, the automatic brake hold function stays turned off. An example of when a record of an automatic brake hold operation is not stored is when, even though the automatic brake hold function is turned on in S6, the driver operates the brake hold switch 45 to turn off the function. In S15, the maneuver controller 12 controls the gearshift 64 so that the gearshift position shifts to the P range to end the automatic parking.

Figure 10:
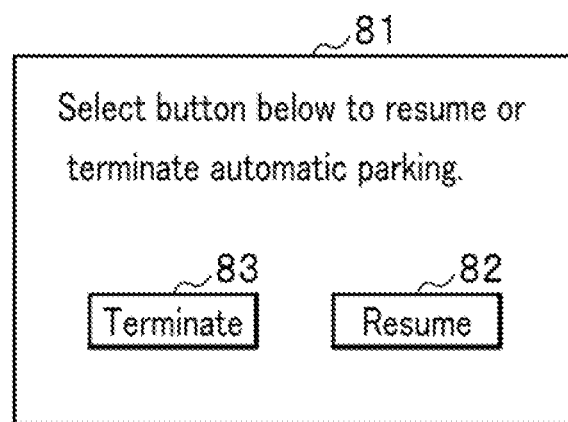
FIG. 10 is a plan view of a selection screen that is displayed on a touch panel by a process that is executed by an automatic parking control unit according to at least one embodiment.

In S16, on the other hand, because the condition to suspend the automatic parking function has been met ("Yes" of S11), the maneuver controller 12 suspends the automatic parking function. Then, the maneuver controller 12 determines whether a condition to resume the automatic parking function exists (S17). A condition to resume exists if a predetermined criterion is met. The predetermined criterion may be met if a predetermined operation is carried out on a selection screen 81 of FIG. 10, the selection screen 81 being one type of automatic parking function screens that are displayed on the touch panel 32. The selection screen 81 displays a "Resume" button 82 and "Terminate" button 83. If the driver operates the "Resume" button 82, the predetermined criterion is met and the condition to resume the automatic parking function exists. If the "Terminate" button 83 is operated, then a termination of the automatic parking function is selected.

If the condition to resume the automatic parking function exists ("Yes" of S17), the process returns to S2 and the automatic parking function resumes. If a predetermined amount of time elapses without the condition to resume the automatic parking function arising ("No" of S17 and "Yes" of S18), the maneuver controller 12 makes a decision to terminate the automatic parking function (S19), and the series of operational steps comes to an end. If the predetermined amount of time has not yet elapsed and the condition to resume the automatic parking function has not arisen ("No" of S17 and "No" of S18), the maneuver controller 12 returns to S16. Note that if the "Terminate" button 83 is operated, the maneuver controller 12 terminates the automatic parking function without waiting for the predetermined amount of time referred to in S18 to elapse.

Note that when the condition to suspend the automatic parking function exists ("Yes" of S11), the maneuver controller 12 may resume the automatic parking function from S2 if the condition to resume the automatic parking function is met ("Yes" of S17). On the other hand, if a condition to terminate is met during the series of operations of the automatic parking function, the maneuver controller 12 terminates the process of FIGS. 4 and 5 and does not resume the process. When the automatic parking function is to start again, the maneuver controller 12 begins the operational steps from S1. The "condition to terminate" may be met if, for example, one of the following criteria is met during the series of operations of the automatic parking function: (a) the gearshift 64 is shifted to a P range; (b) an electric park brake comes into operation; and (c) an instruction to operate the parking brake function has been input via the touch panel 32. Furthermore, if a condition to halt the automatic parking function is met during the series of operations of the automatic parking function, the series of operations of the automatic parking function is brought to a halt. However, in this case, the series of operations of the automatic parking function is resumed from the point at which the operation has been halted if the condition to halt is removed. The "condition to halt" exists if a criterion is met such as an operation of the brake pedal (not shown).

Figure 11:
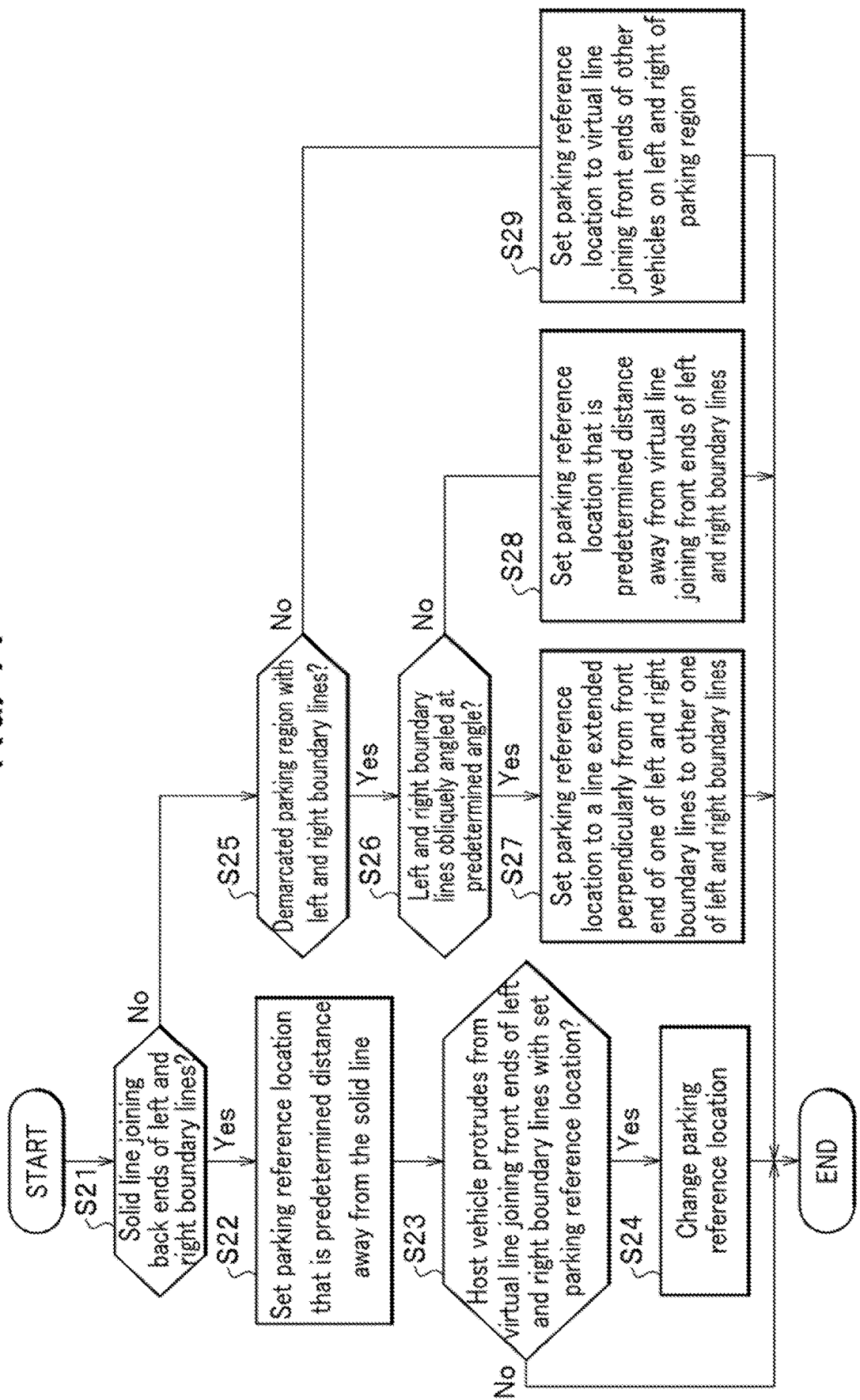
FIG. 11 is a flowchart of a subroutine for a parking reference location determination process of S6 that is executed by an automatic parking control unit according to at least one embodiment.
Figure 12:
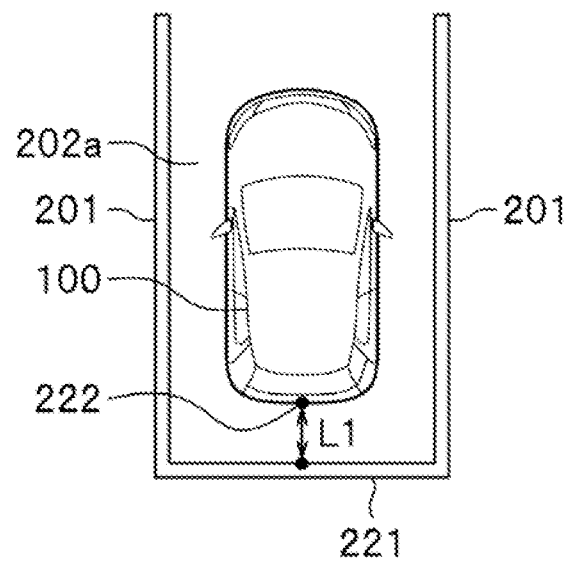
FIG. 12 is a plan view of a parking region for explaining a parking reference location determination process that is executed by an automatic parking control unit according to at least one embodiment.

FIG. 11 is a flowchart of a subroutine for the determination process of the parking reference location of S6. Words expressing directions such as "front" and "back" are used to describe directions from the viewpoint of the host vehicle 100 that is pausing at the change-to-reverse location 262 (see FIG. 9). The process of FIG. 11 is performed based on a situation of the surroundings of the host vehicle 100 as recognized by the recognition part 11. First, as shown in FIG. 12, the determination part 14 determines whether a solid line (or a broken line [the same hereinafter]) 221 joining the rear ends of the left and right boundary lines 201 at the rear of the parking space 202a (a parking region) where the host vehicle 100 is to park (S21). A white line that marks the boundary of the parking space 202a at the rear side thereof may be regarded as a solid line 221. An edge of an obstacle such as a fence, a building, or another vehicle may also be regarded as a solid line 221. In other words, a solid line 221 is a mark or an object that indicates a location of a limit of a parking space 202a on the rear side thereof. If a solid line 221 exists at the rear of the parking region ("Yes" of S21), the decision part 15 sets the parking reference location 222 to a location that is a predetermined distance L1 away (for example, towards the front of the parking region) from the solid line 221 at the rear as shown in FIG. 12. This parking reference location 222 is where the rear end of the host vehicle 100 is to be positioned when parking the host vehicle 100 in the parking space 202a (a parking region).

Figure 13:
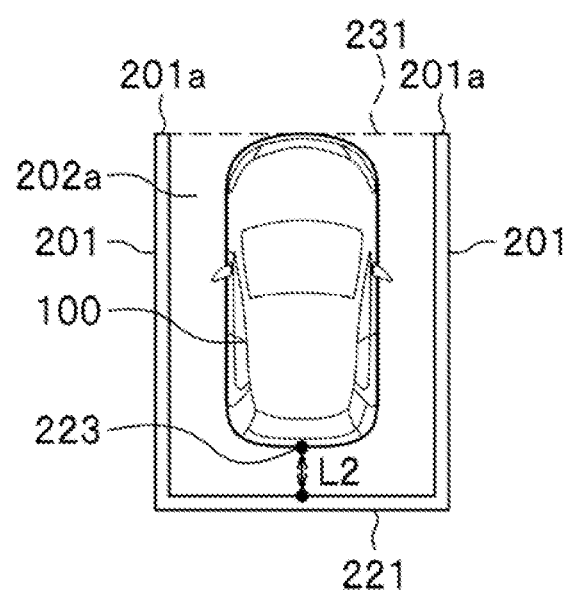
FIG. 13 is a plan view of a parking region for explaining a parking reference location determination process that is executed by an automatic parking control unit according to at least one embodiment.

Next, the determination part 14 determines whether the host vehicle 100 will protrude from a virtual line 231 when the parking reference location 222 remains at the location that has been decided in S22 (S23). A virtual line 231 refers to a line joining the front ends 201a of the left and right white lines (boundary lines) 201 of the parking space 202a (a parking region) as shown in FIG. 13. Whether or not the host vehicle 100 will protrude from the virtual line 231 may be determined from the depth (the length from the entry side to the rear side) of the parking space 202a, the predetermined distance L1, and the length of the host vehicle 100.

When it is determined that the host vehicle 100 will protrude from the virtual line 231 ("Yes" of S23), the parking reference location 222 of FIG. 12 is modified to a parking reference location 223 of FIG. 13 that is further to the back (in the direction that prevents the host vehicle 100 from protruding) of the parking space 202a than the parking reference location 222. The modified parking reference location 223 is a predetermined distance L2(<L1) to the front from the solid line 221 at the rear. The parking reference location 223 is a location that prevents the host vehicle 100 from protruding from the virtual line 231 when the rear end of the host vehicle 100 is aligned with the parking reference location 223 when the host vehicle 100 is parked in the parking space 202a (the parking region).

When a solid line 221 does not exist at the rear of the parking space 202a (a parking region) where the host vehicle 100 is to park ("No" of S21), the determination part 14 determines whether the parking space 202a (a parking region) is a demarcated parking region with boundary lines including at least left and right white lines (boundary lines) 201 (FIGS. 14 and 15) (S25). A "demarcated parking region" refers to a parking region whose region is demarcated by boundary lines including left and right white lines (boundary lines) 201 that is in a parking area 200 where vehicles park side to side such as those shown in FIGS. 6-9.

Figure 14:
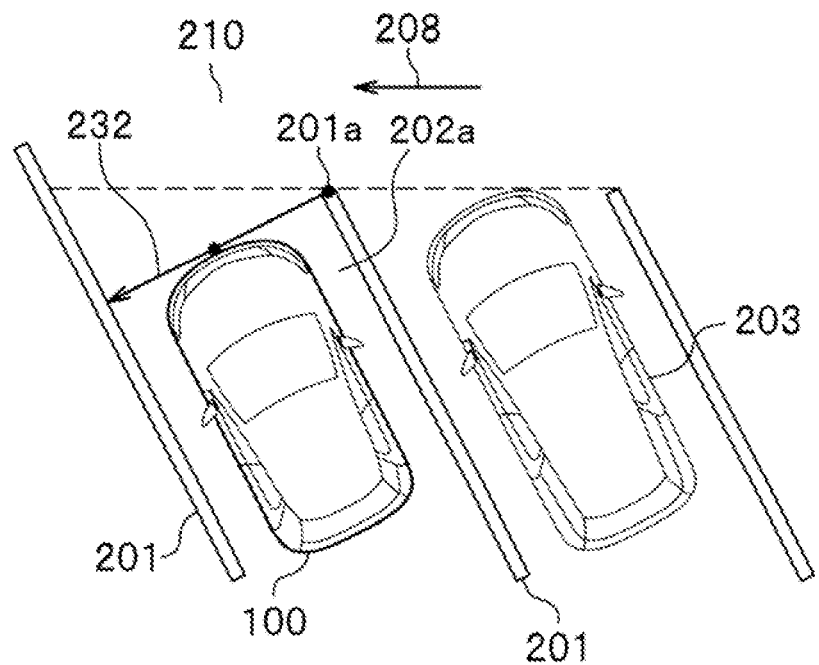
FIG. 14 is a plan view of a parking region for explaining a parking reference location determination process that is executed by an automatic parking control unit according to at least one embodiment.
Figure 15:
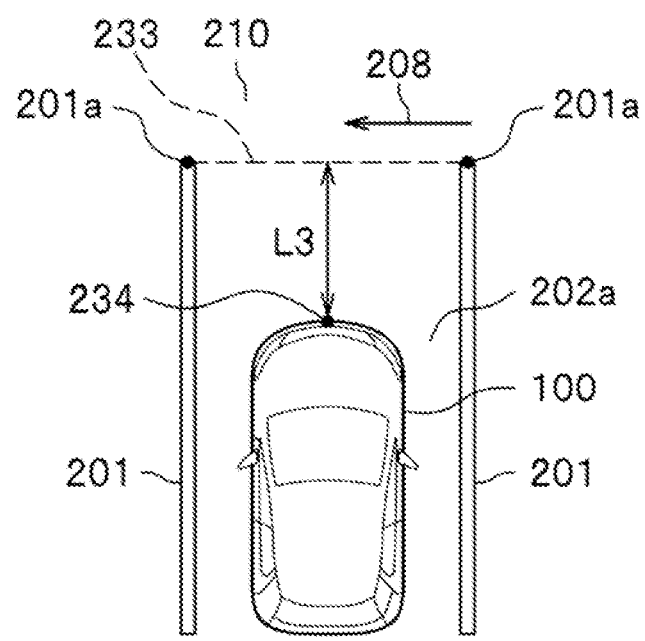
FIG. 15 is a plan view of a parking region for explaining a parking reference location determination process that is executed by an automatic parking control unit according to at least one embodiment.

When the parking space 202a (a parking region) is a demarcated parking region where left and right white lines (boundary lines) 201 exist ("Yes" of S25), the determination part 14 determines whether the left and right boundary lines are oblique angled at a predetermined angle (S26). The determination part 14 determines whether the left and right boundary lines are oblique angled at the predetermined angle by determining whether the left and right boundary lines 201 are, for example, substantially at an angle between 45 and 60 degrees to the direction of travel 208 of the way 210 (i.e., a lengthwise direction of the way 210) in the parking area 200 or not (for example, the left and right boundary lines 201 are at an angle that is at or is close to substantially 90 degrees to the direction of travel 208). FIG. 14 shows an example where the left and right boundary lines 201 are oblique angled at the predetermined angle. FIG. 15 shows an example where the left and right boundary lines 201 are not oblique angled.

When the left and right boundary lines 201 are oblique angled at the predetermined angle ("Yes" of S26), a perpendicular line 232 is set by the decision part 15 as the parking reference location (S27). The perpendicular line 232 is a line that extends perpendicularly from the front end 201a of one of the left and right white lines (boundary lines) 201 to the other one of the left and right white lines (boundary lines) 201. This parking reference location that is set to the perpendicular line 232 becomes a reference location where the front end of the host vehicle 100 is positioned when parking the host vehicle 100 in the parking space 202a (the parking region).

When the left and right boundary lines 201 are not oblique angled at the predetermined angle ("No" of S26), and hence the left and right boundary lines 201 are at an angle that is at or is close to substantially 90 degrees to the direction of travel 208, the operational step advances to S28. In S28, the parking reference location 234 is set by the decision part 15 to a location that is a predetermined distance L3 away from a virtual line 233 that joins the front ends 201a of the left and right white lines (boundary lines) 201 as shown in FIG. 15. More specifically, the parking reference location 234 is set to a location that is further to the rear side of the parking space 202a (a parking region) from the virtual line 233 by the predetermined distance L3. This parking reference location 234 becomes a reference location where the front end of the host vehicle 100 is positioned when parking the host vehicle 100 in the parking space 202a (the parking region).

When the parking space 202a (a parking region) is not a demarcated parking region with left and right white lines (boundary lines) 201 ("No" of S25), the parking space 202a (a parking region) is in a parking area in which no left and right white lines (boundary lines) 201 exist that separate parking regions of individual vehicles parked side by side.

In this case, as shown in FIG. 16, the decision part 15 sets the parking reference location to a virtual line 241 that joins the front ends 203a of other vehicles 203 on the left and right of the parking space 202a (a parking region) (S29). This parking reference location that is set to the virtual line 241 is a straight line across front ends 203a of the other vehicle 203 on the left and right that runs in parallel with the direction of travel 208 of the way 210. This parking reference location that is set to the virtual line 241 becomes a reference location where the front end of the host vehicle 100 is positioned when parking the host vehicle 100 in the parking space 202a (a parking region). In the example of FIG. 16, there are other vehicles 203 on the left and right of the parking space 202a (a parking region), and a virtual line 241 that joins the front ends 203a of the pair of other vehicles 203 are in parallel to the direction of travel 208. When a front end 203a of one of the pair of other vehicles 203 is further out to the front, a line that extends from the front end 203a of the one of the pair of other vehicles 203 (i.e., the other vehicle 203 whose front end 203a is further out to the front) and is parallel to the direction of travel 208 becomes the virtual line 241. When there is only another vehicle 203 on either the left or right of the parking space 202a (a parking region), a line that extends from the front end 203a of the another vehicle 203 and is parallel to the direction of travel 208 becomes the virtual line 241. The same applies when one of the other vehicles 203 on the left and right is parked at a distance from the parking space 202a (a parking region) in which the host vehicle 100 is to park.

According to the automatic parking control unit 1 (the parking assistance device) described above, a parking reference location for parking the host vehicle 100 in a parking region is determined (S27-S29) according to the type of the parking region (the parking space 202a) (S25, S26). In this way, the automatic parking control unit 1 performs automatic parking of the host vehicle 100 at a suitable parking location that is in accordance with the type of a parking region (a parking space 202a) in which the host vehicle 100 is to be parked.

When the parking region (the parking space 202a) is a demarcated parking region with boundary lines including at least left and right boundary lines 201 ("Yes" of S25 and "No" of S26), the parking reference location 234 is set to a location that is a predetermined distance L3 further to the rear of a virtual line 233 joining the front ends 201a of the left and right boundary lines 201 (S28, FIG. 15). If the host vehicle 100 parked with the front end thereof close to the virtual line 233 or protruding from the virtual line 233, there is a rise in risk of the host vehicle 100 coming into contact with another vehicle while the other vehicle parks or leaves on the left or right of the host vehicle 100. The parking reference location 234 is intended to avoid this rise.

When the parking region (the parking space 202a) is a parking region with no boundary lines on the left and right 201 ("No" of S25, FIG. 16), the parking reference location 234 is set to a virtual line 241 joining the front ends 203a of the other vehicles on the left and right 203 (S29). In this way, when at least one of the other vehicles 203 on the left and right are parked somewhat towards the front to avoid an obstacle or another object at the back, by aligning the front end of the host vehicle 100 with the front end of the at least one of the other vehicles 203 when parking, the risk of the host vehicle 100 coming into contact with an obstacle at the back will be reduced.

When the automatic parking control unit 1 recognizes that the left and right boundary lines 201 of the parking region (parking space 202a) are oblique angled at the predetermined angle with respect to the way 210 that the host vehicle 100 is travelling inside the parking area ("Yes" of S26, FIG. 14), the operational step of S27 is performed. In other words, a parking reference location is set to a perpendicular line 232 that extends perpendicularly from a front end 201a of one of the left and right boundary lines 201 of the parking region (parking space 202a) to the other one of the left and right boundary lines 201. If the host vehicle 100 is parked with front end thereof protruding from the perpendicular line 232, there is a rise in risk of the host vehicle 100 coming into contact with another vehicle while the other vehicle leaves or parks on the left or right of the host vehicle 100. Selecting the parking reference location of S27 is intended to reduce this risk.

When the automatic parking control unit 1 determines that a solid line 221 exists at the back of the parking region (the parking space 202a) ("Yes" of S21, FIG. 12), the solid line 221 is prioritized and the parking reference location is determined based on the solid line 221. More specifically, the parking reference location 222 is set to a location that is a predetermined distance L1 away from (i.e., further to the front of) the solid line 221 (S22). If the host vehicle 100 is parked too closely to the solid line 221 such as a white line or an obstacle, the risk of the host vehicle 100 coming into contact with an obstacle including another vehicle parked at the back of the host vehicle 100 increases. Prioritizing the solid line 221 when determining the parking reference location is intended to avoid this increase.

However, when, by adopting the parking reference location 222, the host vehicle 100 protrudes from the virtual line 231 that joins the front ends 201a of the left and right boundary lines 201 of the parking region (the parking space 202a), instead of the predetermined distance L1, a shorter predetermined distance L2 is adopted. The reference location of the host vehicle 100 in the parking region (the parking space 202a) is changed from the parking reference location 222 that has been decided in S22 to a parking reference location 223 (for example, the reference location is moved further back from the parking reference location 222) (S24). If the parked host vehicle 100 protrudes from the virtual line 231, there is a rise in risk of the host vehicle 100 coming into contact with another vehicle while the other vehicle parks or leaves on the left or right of the host vehicle 100. Changing the parking reference location is intended to avoid this rise.

Note that although in the example described above, the host vehicle 100 enters the parking region (the parking space 202a) by reverse parking, the host vehicle 100 may be enter with the front end of the host vehicle 100 entering first (i.e., forward parking). In this case, the parking reference location where the front end of the host vehicle 100 is aligned in the above description becomes a parking reference location where the back end of the host vehicle 100 is aligned, and the parking reference location where the rear end of the host vehicle 100 is aligned becomes the parking reference location where the front end of the host vehicle 100 is aligned.

Note that when the parking space 202a (a parking region) is not a demarcated parking region where left and right white lines (boundary lines) 201 exist, ("No" of S25), and one or both of the other vehicles 203 on the left and right of the parking space 202a (a parking region) are parked with the rear facing the way 210, the front end 203a of the above description for the one or both of the other vehicles 203 is replaced by the rear end of the one or both of the other vehicles 203 that faces the way 210.

What is claimed is:

1. A parking assistance device comprising:
 a processor, wherein the processor is configured to:
 acquire recognition information through recognition of surroundings of a host vehicle;
 perform maneuver control to park the host vehicle in a parking region based on the recognition information;
 keep the host vehicle stationary after the host vehicle is stopped by the maneuver control until a predetermined operation is received from a driver;

determine a type of the parking region in which the host vehicle is to be parked by the maneuver control; and determine, in accordance with the type of the parking region that is determined, a parking reference location that is used to park the host vehicle in the parking region, wherein in response to determining that the type of the parking region is a demarcated parking region that is demarcated by at least left and right boundary lines, the processor is configured to determine whether the left and right boundary lines of the demarcated parking region are oblique angled at a predetermined angle with respect to a way on which the host vehicle travels in a parking area, in response to determining that the left and right boundary lines are oblique angled at the predetermined angle, the processor is configured to:

recognize that the demarcated parking region is demarcated by oblique angled boundary lines, and set the parking reference location to a perpendicular line that extends perpendicularly from a front end of one of the left and right boundary lines of the parking region to a point lying in between and not on the two ends of the other one of the left and right boundary lines, the set parking reference location being a reference location where the front end or the rear end of the host vehicle is positioned when the host vehicle is parked in the parking region in response to determining that the left and right boundary lines are not oblique angled at the predetermined angle, the processor is configured to set the parking reference location to a location that is a first predetermined distance apart from a first virtual line joining front ends of the left and right boundary lines, and in response to determining that the type of the parking region is a parking region that is not demarcated by the at least left and right boundary lines, the processor is configured to set the parking reference location to a location based on a second virtual line joining front ends of other vehicles on a left and right of the parking region.

2. The parking assistance device according to claim 1, wherein in response to determining that the type of the parking region is the demarcated parking region, the processor is configured to determine whether or not back ends of the left and right boundary lines of the demarcated parking region are joined by either a solid line or a broken line, and in response to determining that the back ends of the left and right boundary lines are joined, the processor is configured to set the parking reference location to a location that is a second predetermined distance away from the solid line or the broken line.

3. The parking assistance device according to claim 2 wherein the processor is configured to determine whether the host vehicle will protrude from the first virtual line joining the front ends of the left and right boundary lines by using the parking reference location to park in the parking region, and in response to determining that the host vehicle will protrude from the first virtual line by using the parking reference location, the processor is configured to change the second predetermined distance.

4. A parking assistance method comprising:

acquiring recognition information through recognition of surroundings of a host vehicle;

performing maneuver control to park the host vehicle in a parking region based on the recognition information;

keeping the host vehicle stationary after the host vehicle is stopped with the maneuver control until a predetermined operation is received from a driver;

determining a type of the parking region in which the host vehicle is to be parked with the maneuver control;

determining a parking reference location for parking the host vehicle in the parking region according to the type of the parking region that is determined;

determining, in response to determining that the type of the parking region is a demarcated parking region that is demarcated by at least left and right boundary lines, whether the left and right boundary lines of the demarcated parking region are oblique angled at a predetermined angle with respect to a way on which the host vehicle travels in a parking area;

recognizing, in response to determining that the left and right boundary lines are oblique angled at the predetermined angle, that the demarcated parking region is demarcated by oblique angled boundary lines;

setting, in response to recognizing that the demarcated parking region is demarcated by the oblique angled boundary lines, the parking reference location to a perpendicular line that extends perpendicularly from a front end of one of the left and right boundary lines of the parking region to a point lying in between and not on the two ends of the other one of the left and right boundary lines, the set parking reference location being a reference location where the front end or the rear end of the host vehicle is positioned when the host vehicle is parked in the parking region;

setting, in response to determining that the left and right boundary lines are not oblique angled at the predetermined angle, the parking reference location to a location that is a first predetermined distance apart from a first virtual line joining front ends of the left and right boundary lines; and setting, in response to determining that the type of the parking region is a parking region that is not demarcated by the at least left and right boundary lines, the parking reference location to a location based on a second virtual line joining front ends of other vehicles on a left and right of the parking region.

5. A computer program product including a non-transitory computer readable medium having instructions stored thereon that, when executed by one or more processors, cause the one or more processors to perform operations comprising:

acquiring recognition information through recognition of surroundings of a host vehicle;

performing maneuver control to park the host vehicle in a parking region based on the recognition information;

keeping the host vehicle stationary after the host vehicle is stopped by the maneuver control until a predetermined operation is received from a driver;

determining a type of the parking region in which the host vehicle is to be parked by the maneuver control;

determining a parking reference location for parking the host vehicle in the parking region according to the type of the parking region;

determining, in response to determining that the type of the parking region is a demarcated parking region that is demarcated by at least left and right boundary lines, whether the left and right boundary lines of the demarcated parking region are oblique angled at a predetermined angle with respect to a way on which the host vehicle travels in a parking area;

recognizing, in response to determining that the left and right boundary lines are oblique angled at the predetermined angle, that the demarcated parking region is demarcated by oblique angled boundary lines;

setting, in response to recognizing that the demarcated parking region is demarcated by the oblique angled boundary lines, the parking reference location to a perpendicular line that extends perpendicularly from a front end of one of the left and right boundary lines of the parking region to a point on lying in between and not on the two ends of the other one of the left and right boundary lines, the set parking reference location being a reference location where the front end or the rear end of the host vehicle is positioned when the host vehicle is parked in the parking region;

setting, in response to determining that the left and right boundary lines are not oblique angled at the predetermined angle, the parking reference location to a location that is a first predetermined distance apart from a first virtual line joining front ends of the left and right boundary lines; and setting, in response to determining that the type of the parking region is a parking region that is not demarcated by the at least left and right boundary lines, the parking reference location to a location based on a second virtual line joining front ends of other vehicles on a left and right of the parking region.

6. The computer program product according to claim 5, further comprising:

in response to determining that the type of the parking region is the demarcated parking region, determining whether or not back ends of the left and right boundary lines of the demarcated parking region are joined by either a solid line or a broken line, wherein the determining the parking reference location further comprises, in response to determining that the back ends of the left and right boundary lines are joined, setting the parking reference location to a location that is a second predetermined distance away from the solid line or the broken line.

7. The computer program product according to claim 6, further comprising:

determining whether the host vehicle will protrude from the first virtual line joining the front ends of the left and right boundary lines by using the parking reference location to park in the parking region, wherein the determining the parking reference location further comprises, in response to determining that the host vehicle will protrude from the first virtual line by using the parking reference location, changing the second predetermined distance.

* * * * *